United States Patent
Kim

(10) Patent No.: US 10,980,258 B2
(45) Date of Patent: Apr. 20, 2021

(54) METHOD FOR MANUFACTURING FISH SAUCE USING FERMENTED SOYBEAN LUMP POWDER AND FISH SAUCE MANUFACTURED THEREBY

(71) Applicant: RAKCHUN FOOD CO., LTD., Donghae-si (KR)

(72) Inventor: Chang-Soo Kim, Donghae-si (KR)

(73) Assignee: RAKCHUN FOOD CO., LTD., Donghae-si (KR)

( * ) Notice: Subject to any disclaimer, the term of this patent is extended or adjusted under 35 U.S.C. 154(b) by 176 days.

(21) Appl. No.: 15/558,441

(22) PCT Filed: May 2, 2016

(86) PCT No.: PCT/KR2016/004604
§ 371 (c)(1),
(2) Date: Sep. 14, 2017

(87) PCT Pub. No.: WO2016/175633
PCT Pub. Date: Nov. 3, 2016

(65) Prior Publication Data
US 2018/0064149 A1    Mar. 8, 2018

(30) Foreign Application Priority Data

Apr. 30, 2015    (KR) .................. 10-2015-0062075

(51) Int. Cl.
*A23L 11/20*    (2016.01)
*A23L 17/00*    (2016.01)
(Continued)

(52) U.S. Cl.
CPC ................ *A23L 11/20* (2016.08); *A23B 4/02* (2013.01); *A23L 11/09* (2016.08); *A23L 17/00* (2016.08); *A23L 27/24* (2016.08); *A23V 2002/00* (2013.01)

(58) Field of Classification Search
CPC .................................. A23L 11/20; A23L 27/24
See application file for complete search history.

(56) References Cited

U.S. PATENT DOCUMENTS 3,558,328 A * 1/1971 Luksas .................. A23C 21/02
426/41
2006/0225731 A1* 10/2006 Woortman ........... A23C 9/1544
127/32

FOREIGN PATENT DOCUMENTS

KR    10-1994-0000328    1/1993
KR    10-2000-0054051    9/2000
(Continued)

OTHER PUBLICATIONS

Sook KR 20140069550 Derwent Abstract Jun. 10, 2014 1 page (Year: 2014).*
(Continued)

*Primary Examiner* — Felicia C Turner
(74) *Attorney, Agent, or Firm* — Nixon & Vanderhye P.C.

(57) ABSTRACT

The present invention relates to a method for manufacturing fish sauce using fermented soybean lump powder and fish sauce manufactured thereby. The fish sauce is manufactured according to the present invention which comprises: (S1) a step of mixing 0.5 to 10 weight % of fermented soybean lump powder with regard to the weight of fish sauce; (S2) a ripening step of fermenting a mixture of the fish sauce, fermented soybean lump powder, shiitake mushroom powder and starch powder for 7 to 70 days at 10 to 32° C.; and (S3) filtering the ripened fish sauce mixture to thereby remove sediment. By applying traditional Korean fermented foods, the fish sauce eliminates a peculiar smell which gives displeasure and a fishy smell of fish sauce, significantly enhances the flavor, thereby increasing savory taste, and thus can be harmonized with any dish and can be used for multiple purposes. In addition, sweet and salty tastes are also (Continued)

MIXING FERMENTED SOYBEAN LUMP POWDER WITH FISH SAUCE

RIPENING MIXED FISH SAUCE

FILTERING MIXED FISH SAUCE increased, while the flavor is enhanced. Accordingly, salinity is reduced so that sodium and sugar intake can be reduced, and thus it is expected that the fish sauce can be useful all over the world as well as in Korea.

7 Claims, 1 Drawing Sheet

(51) Int. Cl.
  *A23L 11/00* (2021.01)
  *A23L 27/24* (2016.01)
  *A23B 4/02* (2006.01)

(56) References Cited

FOREIGN PATENT DOCUMENTS

| KR | 10-2007-0078406 | 7/2007 |
| KR | 10-1344850 | 12/2013 |
| KR | 10-1385294 | 4/2014 |
| KR | 10-2014-0069550 | 6/2014 |

OTHER PUBLICATIONS

Wang et al. CN 101664143 Mar. 10, 2010 Derwent Abstract 2 pages (Year: 2010).*
Ei et al. JP 52057319 Derwent Abstract May 11, 1977 (Year: 1977).*

* cited by examiner

MIXING FERMENTED SOYBEAN LUMP POWDER WITH FISH SAUCE
RIPENING MIXED FISH SAUCE
FILTERING MIXED FISH SAUCE

METHOD FOR MANUFACTURING FISH SAUCE USING FERMENTED SOYBEAN LUMP POWDER AND FISH SAUCE MANUFACTURED THEREBY

TECHNICAL FIELD

The present invention relates to a method for manufacturing a fish sauce using fermented soybean lump powder and a fish sauce manufactured thereby, and more particularly, to a method for manufacturing a fish sauce, characterized by including mixing fermented soybean lump powder, which is prepared by fermenting soybean, with a fermented/filtered fish sauce, and ripening and filtering the mixture, wherein the a method may be useful in eliminating a fishy smell of the fish sauce and other miscellaneous smells and causing a potent synergistic effect on a savory taste added when amino acid-based and nucleic acid-based components are mixed, thereby enabling the fish sauce to be used for various kinds of cooking requiring a clean savory taste.

BACKGROUND ART

A fish sauce is a representative marine fermented food produced in Korea, and refers to a mixture of a primary broth obtained by adding culinary salt to all or part of raw materials such as fishes, crustaceans, mollusks, echinoderms, and the like, fermenting and ripening the pickled fish, and filtering or separating the ripened pickled fish and a secondary broth obtained by again fermenting and ripening the pickled fish remaining after the separation and filtering or separating the ripened pickled fish. Anchovy, sand lance, yellow corvina, sardine, cutlassfish, large-eyed herring, tuna, shrimp, and the like are used as source fish species. A traditional method for manufacturing a fish sauce includes adding approximately 20 to 30% culinary salt water to fish bodies, ripening the fish bodies at a room temperature of 15 to 25° C. for a long period of 1 to 2 years, and filtering the ripened fish bodies. Such pickled fish has a rich savory taste because components such as proteins, sugars, lipids, organic acids, and the like are properly dissolved in the pickled fish. Therefore, the pickled fish has been often used as a minor material for Kimchi as well as a main material.

Thailand's fish sauce (Nam Pla) is a natural sauce with savory taste which is obtained by preserving fishes with salt, ripening the fishes for a long period of time, separating solid components of the fishes to gather a broth, which is similar to a Korean anchovy sauce, but has been used more widely due to less strong tastes and flavors. Because all kinds of foods in Thailand contains the fish sauce and there is a rapid increase in demand for the Thailand's fish sauce with the globalization of Thai foods, there is a short supply of the fish sauce.

There are lots of inosinic acid-rich fish sauces in Korea. Among these, an anchovy sauce is especially a sauce with savory taste that becomes famous in the world because the anchovy sauce contains the highest content of inosinic acid.

Because the anchovy sauce contains a large amount of taste compounds, for example, various amino acids such as glutamic acid, glycine, alanine, lysine, and the like, and nucleic acids, and the like, the anchovy sauce has been widely used from old times to season salted vegetables such as Kimchi, and the like. As a protein source, the anchovy sauce serves as a nourishing food, and also has a gustatory effect. Peptides contained in the anchovy sauce have physiological functions such as an antioxidant effect, an antibacterial effect, and the like, and also have an immunoregulatory function, a function as hormones and neurotransmitters, and a body-modulating function such as an antihypertensive effect. Such an anchovy sauce is typically manufactured by mixing fresh anchovy or anchovy powder with salt and water, ripening the resulting mixture and extracting a liquid component generated during the ripening. In the past, the anchovy sauce had such a self-sufficient consumption pattern that a small amount of the anchovy sauce was generally manufactured at home and used to make Kimjang Kimchi or vegetable dishes. However, the anchovy sauce has been mass-produced and sold by companies or individuals as its applications are spread to a wide range of most Korean foods as well as the Kimjang Kimchi or vegetable dishes, resulting in a sudden expansion of consumer market.

Amid this trend, most of the companies or individuals who had manufactured the anchovy sauce have actively conducted a lot of research to manufacture an anchovy sauce having a better taste, especially a deeper savory taste in order to gain a competitive advantage and create more profit.

However, the consumption of fish sauces is being gradually reduced because the fish sauces smell fishy, and have their own peculiar smells and a high degree of salinity. Also, consumers strongly feel a fishy taste and other miscellaneous smells since products have a less salty taste due to a reduction of salt in pickled fish. The peculiar fishy smell of the fish sauce is the major obstacle that keeps consumers who first experience the peculiar fishy smell, especially children or foreigners, from eating.

With reference to the prior-art document known in the related art in this regard, Korean Registered Patent No. 10-1385294 discloses "Process for Producing Soluble Salted Fish Sauce." Here, the soluble salted fish sauce has neither a fishy smell of pickled fish nor peculiar miscellaneous smells, which give displeasure, and has a clean and savory taste due to a variety of rich minerals and amino acids, and the process includes (a) extracting a fish sauce from the pickled fish (fish sauce extraction step); (b) adding any one selected from the group consisting of mulberry leaf powder, salicornia herbacea powder, mulberry powder, gardenia powder, bamboo leaf powder, turmeric powder and *Rubus coreanus* powder to the fish sauce at a content of 0.5% by weight with respect to the weight of the fish sauce, followed by ripening the fish sauce at 5° C. for 2 days (ripening step); and (c) filtering the ripened fish sauce to remove sediment (filtration step).

However, the prior-art document has a drawback in that, because the fishy smell and other miscellaneous smells are eliminated with strong peculiar flavors of additives, there are pros and cons to the peculiar flavors depending on the consumers' tastes, and the fish sauce is limited for use in cooking. Also, the prior-art document has limitations in that a savory taste may be reduced due to the mixed additives.

Accordingly, the present inventors have continuously conducted research to develop a method for manufacturing a fish sauce capable of further enhancing a savory taste and eliminating a fishy smell and other miscellaneous smells, which give displeasure, while solving the above problems, and found that fermented soybean lump powder may be used to eliminate a fishy smell of pickled fish and other miscellaneous smells and simultaneously further enhance a savory taste, thereby improving the consumers' preference. Therefore, the present invention has been completed based on these facts.

DISCLOSURE

Technical Problem

Therefore, the present invention is designed to solve the problems of the prior art, and it is an object of the present invention to provide a method for manufacturing a fish sauce using fermented soybean lump powder, which is capable of eliminating a fishy smell of pickled fish and peculiar miscellaneous smells, which give displeasure, and significantly enhancing a savory taste to improve a taste-modifying property, thereby enabling the fish sauce to be harmonized with any dish and be used for multiple purposes.

It is another object of the present invention to provide a method for manufacturing a fish sauce using fermented soybean lump powder, which is capable of significantly enhancing a savory taste so that consumers can more strongly feel salty and sweet tastes even at the same salinity and removing a portion of salt from the fish sauce to reduce the intake of sodium which has been problematic all over the world.

It is still another object of the present invention to provide a fish sauce using fermented soybean lump powder, which is capable of eliminating a fishy smell of pickled fish and peculiar miscellaneous smells, which give displeasure, and significantly enhancing a savory taste to improve a taste-modifying property, thereby enabling the fish sauce to be harmonized with any dish and be used for multiple purposes.

It is yet another object of the present invention to provide a fish sauce using fermented soybean lump powder, which is capable of significantly enhancing a savory taste so that consumers can more strongly feel salty and sweet tastes even at the same salinity and removing a portion of salt from the fish sauce to reduce the intake of sodium which has been problematic all over the world.

Technical Solution

To solve the above problems, according to an aspect of the present invention, there is provided a method for manufacturing a fish sauce using fermented soybean lump powder, which includes:

(S1) mixing 0.5 to 10% by weight of fermented soybean lump powder with respect to the weight of the fish sauce;

(S2) fermenting a mixture of the fish sauce and the fermented soybean lump powder at 10 to 32° C. for 7 to 70 days (ripening step); and (S3) filtering the ripened fish sauce mixture to remove sediment.

In (S1), shiitake mushroom powder may be further mixed at a content of 0.05 to 6% by weight with respect to the weight of the fish sauce.

In (S1), starch powder may be further mixed at a content of 0.05 to 8% by weight with respect to the weight of the fish sauce.

In (S1), the shiitake mushroom powder and the starch powder may be further mixed at contents of 0.05 to 6% by weight and 0.05 to 8% by weight, respectively, with respect to the weight of the fish sauce.

To solve the above problems, according to another aspect of the present invention, there is provided a fish sauce manufactured by the method.

Advantageous Effects

When the fish sauce using fermented soybean lump powder manufactured according to the present invention is applied to traditional Korean fermented foods, the fish sauce using fermented soybean lump powder can eliminate a fishy smell of pickled fish and peculiar miscellaneous smells, which give displeasure, and significantly enhance a savory taste to improve a taste-modifying property, and thus can be harmonized with any dish and used for multiple purposes.

Also, the fish sauce using fermented soybean lump powder manufactured according to the present invention can synergically increase sweet and salty tastes while enhancing a savory taste, and reduce salinity to reduce the sodium and sugar intake. Therefore, it is expected that the fish sauce will be used all over the world as well as in Korea.

DESCRIPTION OF DRAWINGS

These and other features, aspects, and advantages of preferred embodiments of the present invention will be more fully described in the following detailed description, taken accompanying drawings. In the drawings:

FIG. 1 is a diagram schematically showing a method for manufacturing a fish sauce using fermented soybean lump powder according to the present invention.

BEST MODE

A fish sauce using fermented soybean lump powder according to the present invention, which eliminates a fishy smell and peculiar miscellaneous smells, which give displeasure, enhances a savory taste, and has a reduced content of sodium and sugar, is manufactured by (S1) mixing 0.5 to 10% by weight of fermented soybean lump powder with respect to the weight of the fish sauce; (S2) fermenting a mixture of the fish sauce and the fermented soybean lump powder at 10 to 32° C. for 7 to 70 days (ripening step); and (S3) filtering the ripened fish sauce mixture to remove sediment.

The fish sauce is a representative marine fermented food produced in Korea, and refers to a mixture of a primary broth obtained by adding culinary salt to all or part of raw materials such as fishes, crustaceans, mollusks, echinoderms, and the like, fermenting and ripening the pickled fish, and filtering or separating the ripened pickled fish and a secondary broth obtained by again fermenting and ripening the pickled fish remaining after the separation and filtering or separating the ripened pickled fish. Generally, such pickled fish has been often used as a condiment for improving tastes of other foods.

In the present invention, the fish sauce is a conventional fish sauce, but the present invention is not particularly limited thereto. Preferably, the fish sauce is an anchovy sauce.

Fatty acids in soybean of fermented soybean lump used in the present invention function to reduce a concentration of cholesterol attached to blood vessel walls, and thus are effective in preventing adult diseases.

The fermented soybean lump includes traditional fermented soybean lump and improved fermented soybean lump. The traditional fermented soybean lump is manufactured by fermenting only soybean under a natural condition without artificially inoculating a fungus, and the improved fermented soybean lump is manufactured by inoculating a mold starter (*Aspergillus oryzae*) in boiled soybean and fermenting the boiled soybean.

The traditional fermented soybean lump is manufactured by placing soybean gathered in late fall in water for an sufficient time, boiling the soybean for 5 hours or more, and then fermenting the soybean in the form of grains for 3 to 7 days to manufacture fermented soybean lump, or pounding the boiled soybean in a mortar, molding the pounded soybean into the form of a brick, a square or a large bowl, and hardening the molded soybean paste while cooling the molded soybean paste. When the hardened soybean lump is tied with rice straw and held on the wall in a room, the soybean lump is naturally fermented as the fungi grow on a surface of the soybean lump and bacteria breed between cracks of the soybean lump. By next spring, the soybean lump held on the wall is gathered, covered with a blanket, and the like to keep the soybean lump warm, post-fermented, and then dried in the sun to remove foreign substances and fungi on the surface of the soybean lump, thereby manufacturing the traditional fermented soybean lump.

The improved fermented soybean lump may be classified into three types: 1) Chunk-type fermented soybean lump: Selected soybean is immersed in water (for 18 to 30 hours), boiled, and then cooled. In this case, *Aspergillus oryzae* is mixed with the boiled soybean, and the boiled soybean is pounded in a mortar, and molded into a certain shape such as a brick shape, and then fermented at 20 to 25° C. When the soybean lump is covered with blue and green fungi, the soybean lump is dried, and used as fermented soybean lump. 2) Grain-type fermented soybean lump: Procedures are performed in the same manner as in the chunk-type fermented soybean lump until *Aspergillus oryzae* is inoculated. Grains of the inoculated soybean are put into a soup box to a thickness of 3 cm, kept warm at 30 to 35° C. for 6 to 12 hours, spread grain by grain when the grains of soybean are covered with white fungi, and then fermented at 20 to 30° C. for 3 to 4 days. When the grains of soybean are covered with greenish yellow fungi, the grains of soybean are dried to obtain grain-type fermented soybean lump. 3) Noodle-type fermented soybean lump: *Aspergillus oryzae* is inoculated in the same manner as in the chunk-type fermented soybean lump, and the boiled soybean inoculated with *Aspergillus oryzae* is grounded in a chopper, and simultaneously extruded to pull out noodles. The noodles are put into a soup box, fermented in the same manner as in the grain-type fermented soybean lump, and then dried to obtain yellowish green noodle-type fermented soybean lump.

Both the traditional fermented soybean lump and the improved fermented soybean lump may be used as the fermented soybean lump used in the present invention. In the present invention, the fermented soybean lump is characterized by being ground into powder and used in the form of powder.

In the present invention, because fermented soybean lump powder obtained by grinding the fermented soybean lump into powder is used without using the fermented soybean lump in the form of chunk, the efficiency of hydrolysis of proteins and carbohydrates may be enhanced so that taste compounds exuding from the fermented soybean lump can be easily dissolved in a fish sauce. Therefore, the fermented soybean lump powder has an advantage in that a larger amount of salt in the fish sauce is adsorbed onto the fermented soybean lump powder, and then removed. Also, the fermented soybean lump powder has advantages in that aromatic components of the fermented soybean lump are more effective in eliminating a fishy smell of the fish sauce and preventing taste compounds generated in the fermented soybean lump from being wasted.

In (S1) of the method for manufacturing a fish sauce using fermented soybean lump powder according to the present invention, the fermented soybean lump powder is used at an amount of 0.5 to 10% by weight, preferably 0.5 to 8% by weight with respect to the weight of the fish sauce. In this case, when the fermented soybean lump powder is used at an amount of less than 0.5% by weight, an effect of eliminating a fishy smell of the fish sauce may not be achieved. On the other hand, when the fermented soybean lump powder is used at an amount of greater than 10% by weight, the fish sauce may taste stale.

In (S1), the fish sauce using fermented soybean lump powder according to the present invention may be manufactured by further mixing 0.05 to 6% by weight of shiitake mushroom powder with respect to the weight of the fish sauce.

In (S1), the fish sauce using fermented soybean lump powder according to the present invention may be manufactured by further mixing 0.05 to 8% by weight of starch powder with respect to the weight of the fish sauce.

Also, in (S1), the fish sauce using fermented soybean lump powder according to the present invention may be manufactured by further mixing 0.05 to 6% by weight of the shiitake mushroom powder and 0.05 to 8% by weight of the starch powder with respect to the weight of the fish sauce.

Because shiitake mushroom used in the present invention contains a large amount of a compound referred to as eridademin, the shiitake mushroom serves to reduce a blood cholesterol level and lower blood pressure. Therefore, the shiitake mushroom is used to prevent hypertension or arteriosclerosis. Also, the shiitake mushroom is also rich in vitamin B1 and B2.

A savory taste of the shiitake mushroom comes from guanylic acid which is a component of nucleic acid-based condiments. A flavor comes from lenthionine. In addition, the shiitake mushroom contains a large amount of ergosterol having an effect of vitamin D. In this case, ergosterol is in vivo converted into vitamin D when the skin is exposed to ultraviolet light. Meanwhile, it was found that a large amount of vitamin B12 known not to be present in plants is present in the shiitake mushroom. Therefore, the shiitake mushroom powder may be used in the present invention to effectively eliminate a fishy smell of the fish sauce.

In (S1) of the method for manufacturing a fish sauce using fermented soybean lump powder according to the present invention, the fish sauce may be manufactured by mixing shiitake mushroom powder at an amount of 0.05 to 6% by weight with respect to the weight of the fish sauce. In this case, when the shiitake mushroom powder is used at an amount of less than 0.05% by weight, an effect of eliminating a fishy smell of the fish sauce may not be achieved. On the other hand, when the shiitake mushroom powder is used at an amount of greater than 6% by weight, the fish sauce may taste stale.

Because α-amylases degrading starch into sugars are present in the fish sauce, starch present in crops such as wheat, glutinous rice, rice, barley, and the like is effectively degraded into sugars to improve a sweet taste. In particular, because β-amylases are present in wheat flour, the starch is more effectively degraded into sugars. When the starch is degraded into sugars, a flavor of the fish sauce is improved, and thus fermentation is effectively performed as rich nutrients are fed to fermentation strains.

In (S1) of the method for manufacturing a fish sauce using fermented soybean lump powder according to the present invention, the fish sauce may be manufactured by mixing starch powder at an amount of 0.05 to 8% by weight, preferably 0.05 to 6% by weight with respect to the weight of the fish sauce. In this case, when the starch powder is used at an amount of less than 0.05% by weight, an effect of eliminating a fishy smell of the fish sauce may not be achieved. On the other hand, when the starch powder is used at an amount of greater than 8% by weight, the fish sauce may taste stale.

In the method for manufacturing a fish sauce using fermented soybean lump powder according to the present invention, starch powders derived from wheat, glutinous rice, non-glutinous rice, barley, sweet potato, potato, and the like, or expanded starches derived from expanded rice flour, expanded wheat flour, expanded glutinous rice flour, expanded barley flour, and the like, and other starch powders that may be used in foods may be used as the starch powder. Preferably, wheat flour is used. The starch powder may be mixed after being boiled, and the expanded starch may be directly mixed without any particular processing.

In (S1) of the method for manufacturing a fish sauce using fermented soybean lump powder according to the present invention, the fish sauce may also be manufactured by mixing 0.05 to 6% by weight of the shiitake mushroom powder and 0.05 to 8% by weight of the starch powder together.

In (S2) of the method for manufacturing a fish sauce using fermented soybean lump powder according to the present invention, a mixture of the fish sauce and the fermented soybean lump powder is characterized by being fermented at 10 to 32° C. for 7 to 70 days, preferably 20 to 60 days to be ripened.

Salt present in the fish sauce is adsorbed onto the fermented soybean lump powder during such a ripening period to reduce salinity of the fish sauce. In a subsequent filtration step, the salt adsorbed onto the fermented soybean lump powder is removed together while the fermented soybean lump powder is being filtered, thereby reducing the salinity of the fish sauce.

In the method for manufacturing a fish sauce using fermented soybean lump powder according to the present invention, (S3) includes filtering the ripened fish sauce mixture to remove sediment. Here, this is done for the purpose of dissolving taste compounds, which exude from the fermented soybean lump added to effectively eliminate a fishy smell of the fish sauce and other miscellaneous smells, in the fish sauce without wasting the taste compounds. In this case, a larger amount of the salt in the fish sauce may be adsorbed onto the fermented soybean lump powder, and then discharged out during a filtration process.

As described above, the fish sauce is a traditional fermented food rich in inosinic acid, and the fermented soybean lump powder is a traditional fermented food rich in glutamic acid. The shiitake mushroom powder is a food rich in guanic acid. Inosinic acid and guanic acid are main components of nucleic acid-based condiments, and may remarkably enhance a savory taste when bound to glutamic acid that is a component of amino acid-based condiments. Also, when the starch powder is degraded into sugars by α-amylases included in the fish sauce to enhance a sweet taste, a flavor of the fish sauce may be improved, and thus fermentation may be effectively performed as rich nutrients are fed to fermentation strains. When the aforementioned components are mixed at a certain ratio, the fermented soybean lump powder comes into contact with the salt-containing fish sauce to initiate secondary fermentation. Then, the fermented soybean lump may be fermented and hydrolyzed to further generate free amino acids, free sugars, organic acids and aromatic components, which may have a synergistic effect with the taste compounds (including inosinic acid) of the fish sauce, thereby enhancing a flavor.

Also, when the savory taste is improved, sweet and salty tastes may be synergically increased. Accordingly, the fish sauce according to the present invention may reduce salinity and enhance the sweet and salty tastes to reduce the intake of sodium which has been problematic all over the world.

MODE FOR INVENTION

Hereinafter, the present invention will be described in detail with reference to embodiments thereof to aid in understanding the present invention. However, it should be understood that the embodiments of the present invention can be implemented in various forms, but are not intended to limit the scope of the present invention. The embodiments of the present invention are provided herein to describe the present invention more fully to persons having ordinary skill in the art.

<Example 1> Manufacture of Fish Sauce Using Fermented Soybean Lump Powder 0.5 kg of fermented soybean lump powder was mixed with 20 kg of an anchovy sauce. Thereafter, the mixed anchovy sauce was put into a plastic jar, and then ripened at 20° C. for 30 days.

During a ripening period, the plastic jar was swayed once every 5 to 7 days so that the fermented soybean lump powder was thoroughly mixed with the fish sauce in order to promote fermentation and taste compounds were easily dissolved in the fish sauce.

The ripened anchovy sauce was filtered to remove sediment of the fermented soybean lump powder. A filtration process was additionally performed twice to completely remove sediment and suspended matters in the anchovy sauce. Then, the resulting anchovy sauce was stored in a storage container, thereby completing the manufacture of the fish sauce using the fermented soybean lump powder.

<Example 2> Manufacture of Fish Sauce Using Fermented Soybean Lump Powder Containing Fermented Soybean Lump Powder and Shiitake Mushroom Powder 0.5 kg of fermented soybean lump powder and 0.2 kg of shiitake mushroom powder were mixed with 20 kg of an anchovy sauce. Thereafter, the mixed anchovy sauce was put into a plastic jar, and then ripened at 20° C. for 30 days.

During a ripening period, the plastic jar was swayed once every 5 to 7 days so that the fermented soybean lump powder and the shiitake mushroom powder were thoroughly mixed with the fish sauce in order to promote fermentation and taste compounds were easily dissolved in the fish sauce.

The ripened anchovy sauce was filtered to remove sediment of the fermented soybean lump powder and the shiitake mushroom powder. A filtration process was additionally performed twice to completely remove sediment and suspended matters in the anchovy sauce. Then, the resulting anchovy sauce was stored in a storage container, thereby completing the manufacture of the fish sauce using the fermented soybean lump powder.

<Example 3> Manufacture of Fish Sauce Using Fermented Soybean Lump Powder Containing Fermented Soybean Lump Powder and Wheat Flour 0.5 kg of fermented soybean lump powder and 0.3 kg of wheat flour were mixed with 20 kg of an anchovy sauce. Thereafter, the mixed anchovy sauce was put into a plastic jar, and then ripened at 20° C. for 30 days.

During a ripening period, the plastic jar was swayed once every 5 to 7 days so that the fermented soybean lump powder and the wheat flour were thoroughly mixed with the fish sauce in order to promote fermentation and taste compounds were easily dissolved in the fish sauce.

The ripened anchovy sauce was filtered to remove sediment of the fermented soybean lump powder and the wheat flour. A filtration process was additionally performed twice to completely remove sediment and suspended matters in the anchovy sauce. Then, the resulting anchovy sauce was stored in a storage container, thereby completing the manufacture of the fish sauce using the fermented soybean lump powder.

<Example 4> Manufacture of Fish Sauce Using Fermented Soybean Lump Powder Containing Fermented Soybean Lump Powder, Shiitake Mushroom Powder and Wheat Flour 0.5 kg of fermented soybean lump powder, 0.2 kg of shiitake mushroom powder, and 0.3 kg of wheat flour were mixed with 20 kg of an anchovy sauce. Thereafter, the mixed anchovy sauce was put into a plastic jar, and then ripened at 20° C. for 30 days.

During a ripening period, the plastic jar was swayed once every 5 to 7 days so that the fermented soybean lump powder, the shiitake mushroom powder, and the wheat flour were thoroughly mixed with the fish sauce in order to promote fermentation and taste compounds were easily dissolved in the fish sauce.

The ripened anchovy sauce was filtered to remove sediment of the fermented soybean lump powder, the shiitake mushroom powder, and the wheat flour. A filtration process was additionally performed twice to completely remove sediment and suspended matters in the anchovy sauce. Then, the resulting anchovy sauce was stored in a storage container, thereby completing the manufacture of the fish sauce using the fermented soybean lump powder.

Comparative Example 1

An anchovy sauce was manufactured in the same manner as in Example 1, except that fermented soybean lump in the form of chunk was used instead of the fermented soybean lump powder.

Comparative Example 2

An anchovy sauce was manufactured using a conventional method without using the fermented soybean lump powder, the shiitake mushroom powder, and the wheat flour.

<Experimental Example 1> Measurement of Salinity of Anchovy Sauce

The salinity of each of the anchovy sauces manufactured in Examples 1 to 4 and the anchovy sauces manufactured in Comparative Examples 1 and 2 was measured using a Mohr method. Each of the anchovy sauces manufactured in Examples 1 to 4 and Comparative Examples 1 and 2 was ground, and 1 g of the anchovy sauce was diluted 100-fold to obtain 10 mL of the diluted anchovy sauce. Thereafter, 1 mL of 2% potassium chromate ($K_2CrO_4$) was added thereto, and titrated with 0.02 N $AgNO_3$ to measure salinity of the anchovy sauce. The results are listed in the following Table 1.

TABLE 1

| | Example 1 | Example 2 | Example 3 | Example 4 | Experimental Example 1 | Experimental Example 3 |
|---|---|---|---|---|---|---|
| Salinity | 1.7 | 1.7 | 1.6 | 1.5 | 2.0 | 2.5 |
| | 1.8 | 1.6 | 1.6 | 1.5 | 2.2 | 2.7 |

As listed in Table 1, it can be seen that the anchovy sauces manufactured in Examples 1 to 4 of the present invention had a lower salinity, compared to the fish sauces manufactured in Comparative Examples 1 and 2.

<Experimental Example 2> Analysis of Sensory Characteristics

To check sensory characteristics of the anchovy sauces manufactured in Examples 1 to 4 of the present invention, a sensory test was carried out on the anchovy sauces of Examples 1 to 4 and the anchovy sauces of Comparative Examples 1 to 2 by a panel of 80 experts. The sensory test used a 7-point scale method to evaluate a total of six sensory evaluation items such as appearance, miscellaneous smells, fishy smell, salty taste, sweet taste, and savory taste. The results are listed in the following Table 2. In this case, average±standard deviation (SD) values were calculated through repeated experiments conducted in quintuplicate.

TABLE 2

| Sensory evaluation items | Example 1 | Example 2 | Example 3 | Example 4 | Experimental Example 1 | Experimental Example 2 |
|---|---|---|---|---|---|---|
| Appearance | 4.2 | 4.3 | 4.2 | 4.3 | 3.3 | 2.9 |
| Miscellaneous smells | 4.5 | 4.7 | 4.6 | 4.8 | 3.6 | 2.6 |
| Fishy smell | 4.8 | 5.0 | 4.8 | 5.2 | 3.4 | 3.0 |
| Salty taste | 4.7 | 4.9 | 4.8 | 5.1 | 3.8 | 3.0 |
| Sweet taste | 4.9 | 5.1 | 5.0 | 5.2 | 3.9 | 2.7 |
| Savory taste | 4.8 | 5.2 | 4.9 | 5.2 | 3.2 | 3.1 |

As listed in Table 2, it was revealed that the anchovy sauces of Examples 1 to 4 of the present invention had effects highly superior to the anchovy sauces of Comparative Examples 1 and 2 for the sensory evaluation of appearance, miscellaneous smells, fishy smell, salty taste, sweet taste, and savory taste. In particular, from the sensory evaluation, it can be seen that the anchovy sauces of the examples of the present invention had a higher degree of preference over the anchovy sauces of the comparative examples because the anchovy sauces of the present invention enhanced the sweet and savory tastes while remarkably reducing a fishy smell and miscellaneous smells.

As described above, when the fish sauce according to the present invention is applied to traditional Korean fermented foods, the fish sauce according to the present invention may eliminate a fishy smell of pickled fish and peculiar miscellaneous smells, which give displeasure, significantly enhance a savory taste to improve a taste-modifying property, and thus may be harmonized with any dish and used for multiple purposes. Also, the fish sauce according to the present invention may synergically increase sweet and salty tastes while enhancing a savory taste, and reduce salinity to reduce the sodium and sugar intake. Therefore, it is expected that the fish sauce will be used all over the world as well as in Korea.

The invention claimed is:

1. A method for manufacturing a fish sauce using fermented soybean lump powder, comprising:
   (S1) mixing 0.5 to 10% by weight of fermented soybean lump powder and fish sauce with respect to the weight of the fish sauce, and further mixing in shiitake mushroom powder or starch powder;
   (S2) fermenting a mixture of the fish sauce and the fermented soybean lump powder at 10 to 32° C. for 7 to 70 days so as to make ripened fish sauce mixture; and
   (S3) filtering the ripened fish sauce mixture to remove sediment.

2. The method of claim 1, wherein, in (S1), shiitake mushroom powder is mixed at a content of 0.05 to 6% by weight with respect to the weight of the fish sauce.

3. The method of claim 1, wherein, in (S1), starch powder is mixed at a content of 0.05 to 8% by weight with respect to the weight of the fish sauce.

4. The method of claim 1, wherein in (S1), the shiitake mushroom powder is mixed at a content of 0.05 to 6% by weight with respect to the weight of the fish sauce.

5. The method of claim 1, wherein in (S1), the starch powder is mixed at a content of 0.05 to 8% by weight with respect to the weight of the fish sauce.

6. The method of claim 1, wherein in (S1), comprising mixing in both the shiitake mushroom powder and the starch powder.

7. The method of claim 6, the shiitake mushroom powder is mixed at a content of 0.05 to 6% by weight with respect to the weight of the fish sauce, and the starch powder is mixed at a content of 0.05 to 8% by weight with respect to the weight of the fish sauce.

* * * * *